(12) United States Patent
Maniak et al.

(10) Patent No.: US 7,316,556 B2
(45) Date of Patent: Jan. 8, 2008

(54) APPARATUS FOR CUTTING DOUGH WITH NESTED PATTERN CUTTERS

(75) Inventors: Douglas C. Maniak, Ramsey, MN (US); Susan Y. deWerff, Minnetonka, MN (US); Amy B. Larson Kolbe, Woodbury, MN (US); Sherri A. Slocum, Plymouth, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 22 days.

(21) Appl. No.: 11/158,560

(22) Filed: Aug. 26, 2005
(Under 37 CFR 1.47)

(65) Prior Publication Data

US 2006/0210665 A1 Sep. 21, 2006

Related U.S. Application Data

(62) Division of application No. 10/246,810, filed on Sep. 18, 2002, now Pat. No. 6,953,596.

(51) Int. Cl.
*A21C 11/10* (2006.01)

(52) U.S. Cl. ...................... 425/306; 425/307

(58) Field of Classification Search ............ 425/284, 425/287, 311, 292, 295, 289, 298, 306, 307; 83/595, 32
See application file for complete search history.

(56) References Cited

U.S. PATENT DOCUMENTS

| | | | |
|---|---|---|---|
| 1,937,904 A * | 12/1933 | Mosher | 425/288 |
| 2,635,693 A * | 4/1953 | Gibby | 83/355 |
| 3,427,910 A | 2/1969 | Zempel | |
| 3,494,302 A | 2/1970 | Wolf et al. | |
| 3,604,366 A | 9/1971 | Jarrett | |
| D270,599 S | 9/1983 | Gershman | |
| 4,643,084 A * | 2/1987 | Gomez | 99/352 |
| 4,719,117 A * | 1/1988 | Simelunas | 426/502 |
| 5,009,141 A * | 4/1991 | Julian et al. | 83/857 |
| 5,169,664 A | 12/1992 | Ueno et al. | |
| 5,194,273 A | 3/1993 | De Bruiine et al. | |
| 5,204,125 A | 4/1993 | Larsen | |
| 5,337,640 A * | 8/1994 | Arnoth et al. | 83/444 |
| 5,365,816 A * | 11/1994 | Rudy | 83/177 |
| 5,388,390 A | 2/1995 | Finkowski et al. | |
| 5,409,721 A | 4/1995 | Rademaker | |
| 5,606,906 A | 3/1997 | Finkowski et al. | |

(Continued)

OTHER PUBLICATIONS

*Practical Baking*, 5th Ed., W. Sultan, pp. 161-162.

(Continued)

*Primary Examiner*—James P. Mackey
*Assistant Examiner*—Dimple N. Bodawala
(74) *Attorney, Agent, or Firm*—Arlene L. Hornilla; Everett Diederiks

(57) ABSTRACT

A method is provided for producing individual dough products, comprising the steps of conveying a continuous dough sheet along a travel path, engaging a first die cutter with a first portion of the dough sheet to cut a first portion of the peripheral shape of at least one dough product, then conveying the continuous dough sheet along the travel path and engaging the second die cutter with the first portion of the dough sheet to cut a second portion of the peripheral shape of at least one dough product.

16 Claims, 8 Drawing Sheets

U.S. PATENT DOCUMENTS

| | | |
|---|---|---|
| 5,858,438 A | 1/1999 | Cummins et al. |
| 5,935,629 A | 8/1999 | Martin |
| 5,979,285 A * | 11/1999 | Rasmussen et al. ......... 83/676 |
| 6,120,827 A | 9/2000 | Rocca |
| 6,158,315 A | 12/2000 | Nowotny et al. |
| 6,248,388 B1 | 6/2001 | Van Eendenburg et al. |
| 6,276,918 B1 * | 8/2001 | Slaughter et al. ........... 425/289 |
| 6,368,647 B1 | 4/2002 | Capodieci |
| 2004/0175453 A1 * | 9/2004 | Baeten et al. ............... 425/289 |

OTHER PUBLICATIONS

*Betty Crocker's Cookbood*, 1982, pp. 212-213.
*Professional Baking*, 2nd Ed., W. Gisslen, 1994, p. 72.
*The Little Guides "Cookies"*.

* cited by examiner

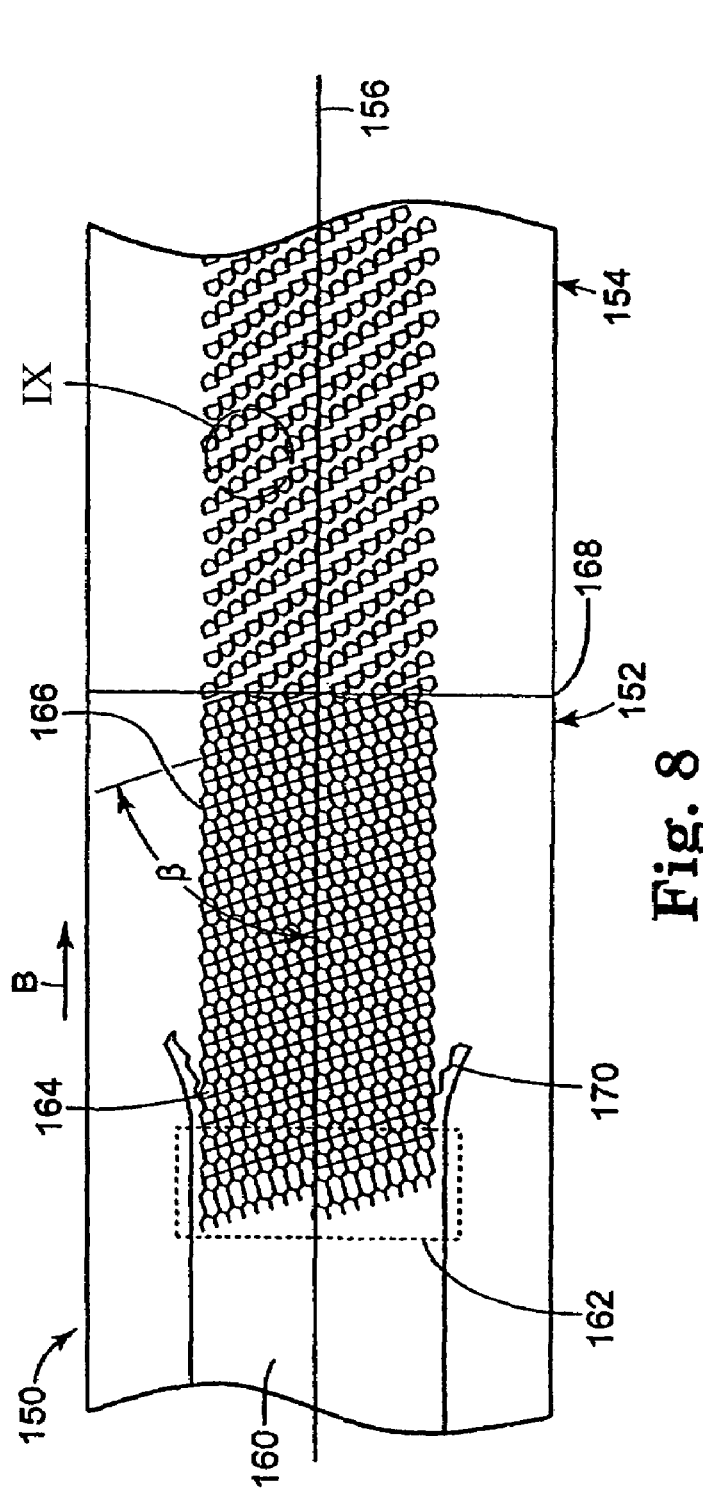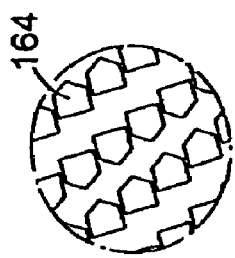
Fig. 8
Fig. 9

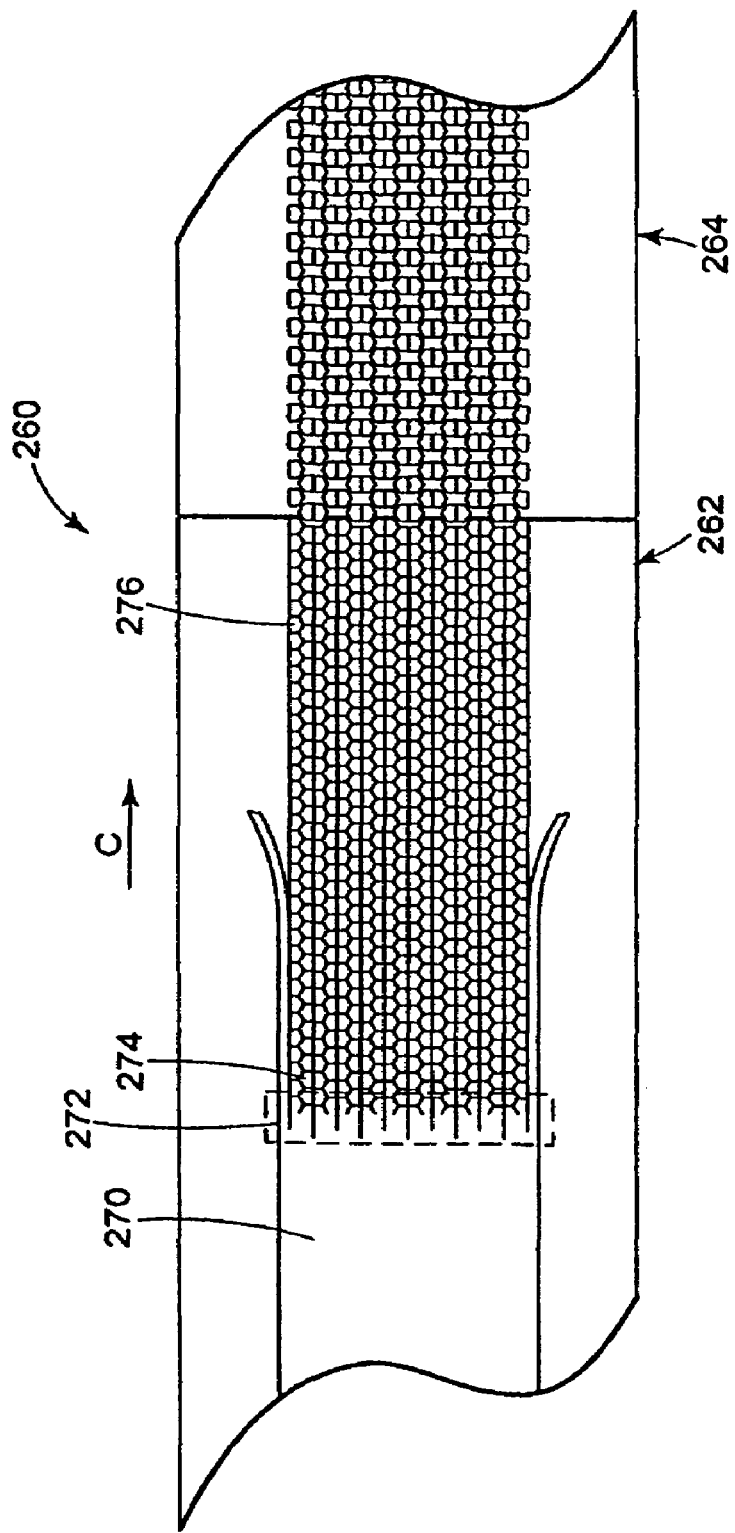

APPARATUS FOR CUTTING DOUGH WITH NESTED PATTERN CUTTERS

REFERENCE TO RELATED APPLICATIONS

This application is a divisional of U.S. patent application Ser. No. 10/246,810 filed on Sep. 18, 2002 now U.S. Pat. No. 6,953,596.

TECHNICAL FIELD

The present invention relates to a method and apparatus for producing discrete dough products from a continuous sheet of dough. More particularly, the present invention relates to cutting relatively thick dough pieces from a sheet of continuously moving dough while minimizing the tendency of the dough products to stick to the cutting devices.

BACKGROUND OF THE INVENTION

Various dough products are commercially produced by extruding a sheet or ribbon of dough of a generally uniform thickness onto a conveying mechanism such as a conveyor belt, then cutting multiple discrete shapes from the dough with an appropriate cutting device. Dough sheets of this type may be moved in a continuous operation or may be indexed along a travel path in a non-continuous manner. In either case, the device that cuts the discrete dough pieces is typically selected to be in synchronization with the conveying mechanism to cut the desired pieces at the appropriate times.

One specific example of a process for cutting discrete pieces from a sheet of dough is referred to as a die-cutting process. In this process, a dough sheet is typically moved or indexed forward along a travel path by incremental amounts with a brief pause period between each subsequent indexing movement. This pause period provides the necessary time for a die cutter to move in a generally perpendicular direction to the dough surface to punch a shape or multiple shapes through the dough. The die cutter then moves away from the dough and back to its starting position while the dough sheet is again indexed forward until the next portion of dough is properly positioned relative to the die cutter for cutting the next section of dough. This cycle may be repeated multiple times to produce the desired quantity of dough products. Examples of dough products produced by such a technique include pizza crusts, pie crusts, and tortillas. With such products, the die is typically circular in shape and cuts through the dough with a single stroke of the die cutter.

In a typical die cutting operation, it is often desirable to minimize the amount of unused material between adjacent cut dough products in order to lessen the amount of dough material that needs to be discarded or reprocessed. Thus, the size of the dough product being cut from the dough sheet and the width of the dough sheet may be selected to maximize the amount of the dough sheet that is included in one of the final dough products. It is not possible, however, to entirely eliminate this excess material when cutting circular shapes, since adjacent circular shapes cannot be completely abutted against each other. It is easier to minimize the amount of this excess dough material when making dough products with straight edges, such as triangles or squares, since each shape can be abutted against or nested with an adjacent shape, with little or no excess material between the shapes.

Dough products may also be cut from a continuous sheet of dough with a rolling die cutter. In this type of process, die blades or edges are mounted on the outside periphery of a circular drum in a particular configuration so that as the drum rotates, the die blades are pressed into a sheet of dough that is moving at a relatively constant speed past the circular drum. The speed at which the circular drum rotates is synchronized with the speed at which the sheet of dough moves so that the final cut dough products have a desired size and shape. Typically, the dough products are then moved to another area for further processing and/or are packaged for shipping to a customer.

In either of these described methods for converting sheets of dough to discrete dough products, it is common to have problems with the dough sticking to the die blades during and after the cutting operation. In some cases, the dough can be coated with flour or oil to decrease the amount of dough sticking to the die blades; however, the use of such additional products may cause undesirable changes to the properties of the dough product. While it is also possible to minimize the tendency of the dough product to stick to the die blades by coating the die blades with a nonstick coating, such nonstick coatings tend to lose their effectiveness over time as they wear out with repeated uses.

Regardless of any techniques used to minimize sticking of dough to the die blades, the tendency of dough to stick to a die is larger for dough sheets with greater thicknesses. This is due, in large part, to the fact that more of the die blade comes in contact with dough during each cutting stroke when the dough is thick than when the dough is thin. In other words, any tendency of the dough to stick to a die blade will increase with a corresponding increase in surface area of the die blade that contacts the dough.

The tendency of dough to stick to a die blade also increases for laminated dough products and for dough products having smaller perimeters or "footprints", regardless of the thickness of the dough. In other words, a laminated or non-laminated dough product having a smaller perimeter will be more likely to stick within the confines of a die blade than a product with a larger perimeter. Thus, it is desirable to provide a method for die cutting a dough product that is both relatively thick and relatively small in area or perimeter from a continuous sheet of dough, while minimizing or eliminating the tendency of the dough product to stick to the die blades.

SUMMARY OF THE INVENTION

In one aspect of this invention, a method of producing individual dough products from a continuous dough sheet is provided, where each dough product has a peripheral shape. The method preferably comprises the steps of conveying a continuous dough sheet along a travel path relative to a first die cutter to position a first portion of the dough sheet in a first position, moving the first die cutter toward the first portion of the dough sheet, and engaging the first die cutter with the first portion of the dough sheet to cut a first portion of the peripheral shape of at least one individual dough product, while the first portion of the dough sheet continues to move along the travel path and relative to the first die cutter. The method further includes moving the first die cutter away from the first portion of the dough sheet to essentially complete a cycle of the first die cutter. The method further includes conveying the continuous dough sheet along the travel path relative to a second die cutter to position the first portion of the dough sheet in a second position, moving the second die cutter toward the first portion of the dough sheet, and engaging the second die cutter with the first portion of the dough sheet to cut a second portion of the peripheral shape of the at least one individual dough product, while the first portion of the dough sheet continues to move along the travel path and relative to the second die cutter. In this method, the first die cutter may be designed so that it cuts a first portion of the peripheral shape and the second die cutter may be designed so that when it cuts the dough, it completes this peripheral shape.

This invention also provides for a die cutter for cutting a plurality of dough pieces from a continuous sheet of dough. The die cutter comprises a base plate having a first side and an opposite second side, a first blade pattern extending from the first side of the base plate, where the first blade pattern comprises at least one blade section for cutting a first portion of the periphery of a first dough piece. The die cutter further comprises a second blade pattern extending from the first side of the base plate, where the second blade pattern is spaced from the first blade pattern and comprises at least one blade section for cutting a second portion of the periphery of the first dough piece. The first blade pattern and second blade pattern are provided to cut complimentary portions of the first dough piece to thereby cut the entire periphery of the first dough piece.

BRIEF DESCRIPTION OF THE DRAWINGS

The present invention will be further explained with reference to the appended Figures, wherein:

FIG. 8 is a top view of a conveyor system of the present invention;

FIG. 9 is an enlarged view of a portion of the dough pieces in FIG. 8;

FIG. 11 is a top view of a conveyor system using a die cutter of the type illustrated in FIG. 10.

DETAILED DESCRIPTION OF THE PREFERRED EMBODIMENTS

Figure 1:
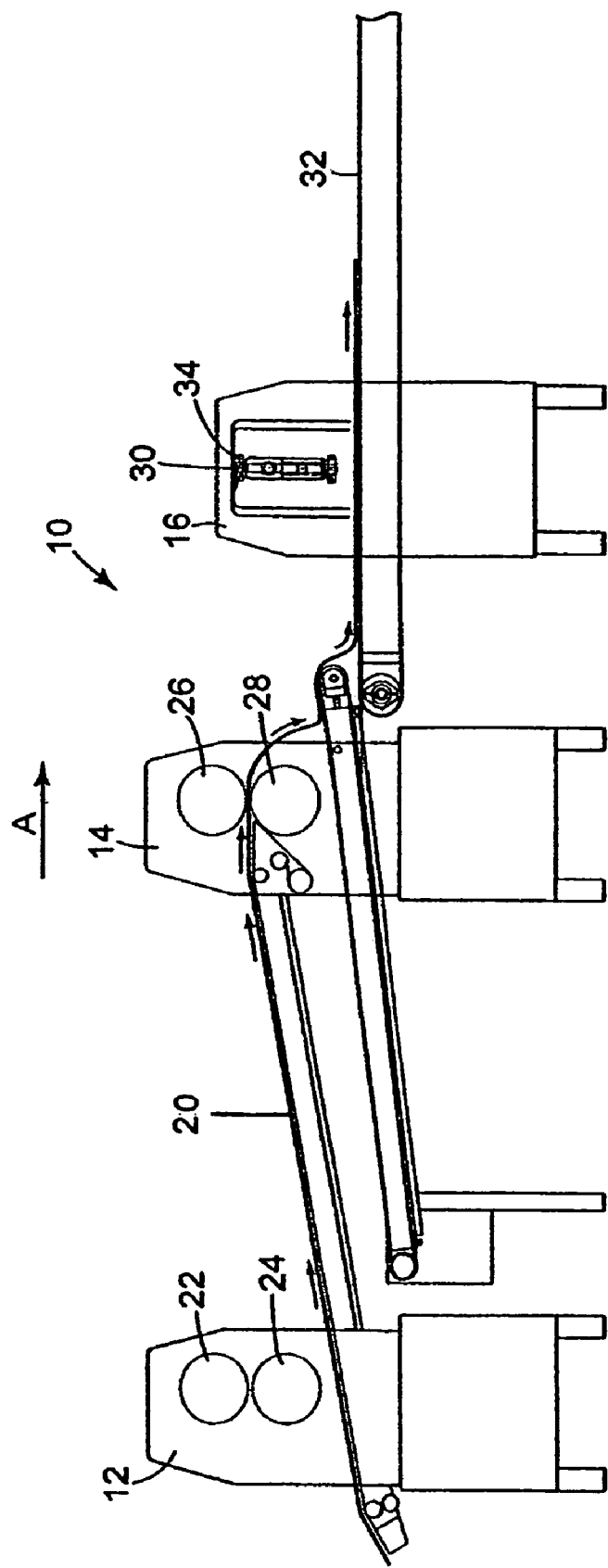
FIG. 1 is a side view of several pieces of equipment of a dough processing production line.

Referring now to the Figures, wherein the components are labeled with like numerals throughout the several Figures, and initially to FIG. 1, one preferred configuration of a part of a dough processing production line 10 is illustrated which basic equipment includes a first reduction or sheeting station 12, a second reduction or sheeting station 14, a cutting station 16, and a product processing conveyor 32. Prior to the first reduction station 12, the production line could include a variety of equipment and processing steps, where one configuration includes a mixer for combining various ingredients into a dough mixture, a hopper for feeding the dough mixture from the mixer to another piece of processing equipment, and an extruder or other similar machine for manipulating the dough into a continuous ribbon or sheet of dough material.

Additional pieces of equipment may also be used in the production line to process the dough, such as equipment capable of making laminated dough sheets by rolling dough into a sheet and folding the dough sheet over onto itself one or more times. In a preferred laminated dough sheet, layers of fat or dry flour are also introduced between the layers of dough to keep them from sticking to each other and to provide various product characteristics. In general, laminated dough sheets can include approximately 8 to 64 layers of shortening that are alternated in a stacking arrangement with layers of dough; however, more or less shortening and dough layers may be used. While a laminated dough sheet may be generically referred to as a "dough sheet", laminated dough sheets can present different processing issues as compared to homogeneous dough sheets. These issues are described below with regard to die cutters.

The first reduction station 12 receives a continuous dough sheet 20 that was processed on the preceding equipment to be a relatively thick and narrow continuous ribbon of dough. Dough sheet 20 is then conveyed by a conveyor belt or other similar equipment along its travel path in a direction A to a pair of compression rollers 22, 24, which compress the dough sheet 20 by a specified amount to make it both thinner and wider than when it entered the station 12. The compression rollers 22, 24 may be similarly sized, as shown, or may be differently sized. Either one of the two rollers may be driven by mechanical means, or alternatively, both rolls may be driven. The dough sheet 20 then continues to be conveyed in direction A to the second reduction station 14, which also includes a pair of compression rollers 26, 28 that are preferably spaced closer to each other than are rollers 22, 24. In this way, rollers 26, 28 can compress the dough sheet further and make dough sheet 20 even thinner and wider. Preferably, the dough sheet 20 that exits the reduction station 14 is at the desired thickness for the final dough products that will be cut therefrom. The production line 10 may include more or less than two reduction stations, wherein each station may include any number of rollers, conveyors, or the like for compressing dough sheets to a desired thickness and width. The selection and placement of equipment depends upon many factors, including the amount of manipulation the dough can tolerate while maintaining important dough material properties (e.g., flexibility).

While this dough processing production line 10 is shown and described as comprising certain manufacturing and processing equipment, the production line 10 may instead comprise more, less, or different pieces of equipment to produce the desired dough for the present invention. For example, a large bulk quantity of dough may be supplied to an extruder that is capable of extruding dough at a desired thickness and width, without the need for additional processing equipment (e.g., reduction stations).

The dough that exits the reduction station 14 is preferably at a predetermined thickness that is the same as the desired thickness of the final individual dough products. This dough sheet 20 may be referred to as a continuous sheet of dough since it is essentially a ribbon of dough that is being continuously extruded, compressed, and processed, rather than being provided in discrete or separate sheets. The dough sheet 20 may have many different material properties, depending on the final dough products that are to be produced. For example, the sheet of dough may be a single, homogeneous dough material throughout the entire sheet, or may include multiple layers of the same or different food products, such as alternating layers of dough and shortening throughout a single dough sheet. The exact selection of materials and combinations of materials can vary widely, depending on the final desired dough products. One example of a dough sheet product is described in co-pending U.S. patent application Ser. No. 10/246,795, filed on the same date as this application, entitle "Tender Laminated Biscuits: (J. Boyle, et al.), commonly assigned to The Pillsbury Company. Such application is hereby expressly incorporated by reference in its entirety. Further, the thickness of the dough sheet can vary from approximately 1 mm thick to 50 mm thick or thicker, where dough that is approximately 30 mm thick would be particularly applicable to individual dinner rolls being cut from a dough sheet.

The dough sheet 20 is then conveyed or moved from reduction station 14 to cutting station 16, which includes a traveling or walking cutter 30 and a product processing conveyor 32. In general, traveling cutter 30 includes a mechanism that allows a cutting device to move downward toward the dough sheet while traveling or moving horizontally in the same direction that the dough sheet is traveling. In a preferred embodiment of the invention, the forward velocity of the cutting device is synchronized to match or closely match the velocity of the moving dough sheet in order to minimize deformation of products cut from the dough sheet. When the cutting device is moving at a speed that matches or closely matches the speed of the moving dough, the cutting device moves downwardly through the thickness of the dough sheet. The cutting device then retracts and moves back into position to repeat this cutting sequence.

While some difference between the forward velocities of the dough sheet and the cutting device may be acceptable, production deformation will increase as the difference in velocities increases. Further, the production rates will typically be higher if the dough moves continuously while being cut than if the dough is indexed and stopped for each cutting sequence. With a traveling cutter, the cutting device has enough time to completely penetrate the entire dough thickness, sever each piece of dough from the surrounding dough of the dough sheet, and retract for the next cutting operation without interrupting the movement of the dough.

This type of walking or traveling cutter is particularly beneficial when cutting thick dough material at production rates because the horizontal movement of the cutter provides uniform, straight edges for each dough piece, rather than the angled edges that would result if the dough was moving horizontally while the cutting device was moving only vertically. These uniform, straight edges can be particularly desirable for laminated dough products to minimize the tendency of the layers to fuse or smudge together along the cut edges of the products and to minimize deformation.

More specifically, traveling cutter 30 comprises an overhead beam 34 to which a cutting device of the present invention is attached, and a corresponding support or backing plate (not shown). The overhead beam 34 should provide at least two directions of travel for the attached cutting device, including movement in the horizontal or X-direction (i.e., the direction of dough travel) and the vertical or Y-direction (i.e., perpendicular to the dough travel direction, in an "up and down" type movement). The motion of the overhead beam 34 may also incorporate movement in a third or Z-direction, which is movement across the width of the dough sheet. This third component of movement may be particularly desirable when cutting relatively intricate patterns, or when using a narrow cutting device to cut a wide sheet of dough.

The corresponding support or backing plate is positioned so that it is generally below the overhead beam 34 and also under the portion of the conveyor 32 that is conveying the dough sheet to the position where it will be cut. This backing plate is designed to provide a support for the conveyor and dough sheet when the cutting device is moved into contact with the dough. The overhead beam 34 and backing plate may be individually driven or mechanically linked to each other to synchronize the movement of these mechanical components relative to each other and relative to the speed and direction of the moving dough sheet. Although the backing plate may incorporate all of the same directional movements as the overhead beam 34, it is also appropriate for the backing plate to move only in the X-direction.

Figure 2:
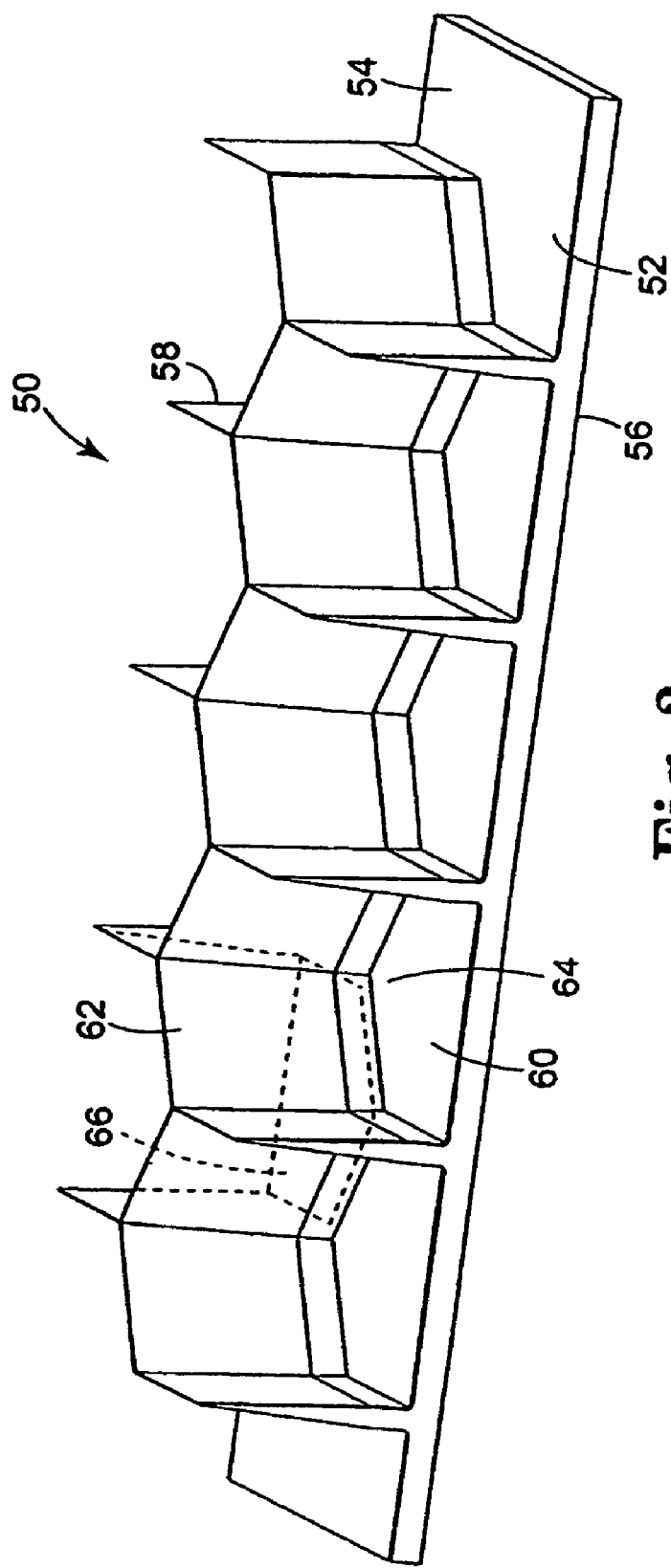
FIG. 2 is a perspective view of one embodiment of a die cutter in accordance with the present invention.

One preferred configuration of a cutting device of the present invention is illustrated in FIG. 2 as die cutter 50. Die cutter 50 generally comprises a support base or plate 52 having a first side 54 and a second side 56, and a series of cutting blades 58 extending from the first side 54 of the support base 52. Support base 52 is attached to the overhead beam 34, which controls the horizontal and vertical movement of die cutter 50. Support base 52 may be attached to the overhead beam 34 in any number of ways, including, for example, mechanical fasteners or magnetic attraction, where the attachment method preferably allows for both secure attachment and easy replacement of the die cutter as necessary or desired.

The die cutter 50 preferably includes a series of cutting blades 58 arranged in a pattern in which minimal or no gaps occur between adjacent dough products. This type of arrangement may be referred to as a "nested" pattern and is advantageous in that the amount of dough remaining between or adjacent to cut dough pieces is eliminated or minimized, while the amount of dough from each sheet made into useful products is maximized. As shown in FIG. 2, the cutting blades 58 are arranged to cut four sides of each shape, with a portion 60 that is open between two cutting blades 58. Many of the blades 58 thus simultaneously cut a portion of two adjacent patterns. For example, a blade segment 62 cuts one side of a pattern 64 and of a pattern 66, where the patterns 64 and 66 are oriented 180 degrees relative to each other. A pattern arranged in this way may be referred to as a nested, "semi-open" pattern since the patterns are nested or abutted against each other and since the open portions (such as portion 60) do not include a blade or blades to complete or enclose an entire pattern that are cut with a single die stroke.

In order to achieve a desired cutting blade arrangement, a blade pattern comprising at least one side may be milled or formed from a single block of material and mounted to a support base or plate. Alternatively, a desired cutting blade arrangement may be provided with multiple individual blades mounted to a support base or plate so that individual blades can be replaced should they become damaged or worn.

The semi-open design is advantageous over a completely closed design, particularly when cutting patterns having a relatively small area or footprint, since the weight of the dough product can itself help prevent the dough from sticking inside the die. In other words, when cutting a dough product having a small footprint from a sheet of dough, the dough is typically less likely to stick to the inside of a die cavity having a semi-open design than to the inside portion of a die cavity that has a closed design.

Although a semi-open die blade pattern can minimize dough sticking to blades, some sticking may still occur, depending on the pattern and dough being cut. Thus, to further assist in product removal from dies, a stripping plate may be incorporated into the die cutter assembly. A stripping plate arrangement may take a number of forms, where one example includes a single plate or multiple stripping plates with cutouts that match the blade pattern of a corresponding die cutter so that the cutting blades can pass through the stripping plates to cut the dough sheet. When the die cutter retracts from the dough, the blades are also pulled back through the openings in the stripper plates. In this way, if any products become lodged in an opening or stuck to cutting blades, the stripping plates will essentially push or release the products from the die cutter. Stripping plates of the type described above, punches, or any other methods or devices that serve this same function could be incorporated into various embodiments of the present invention, as desired.

Figure 3:
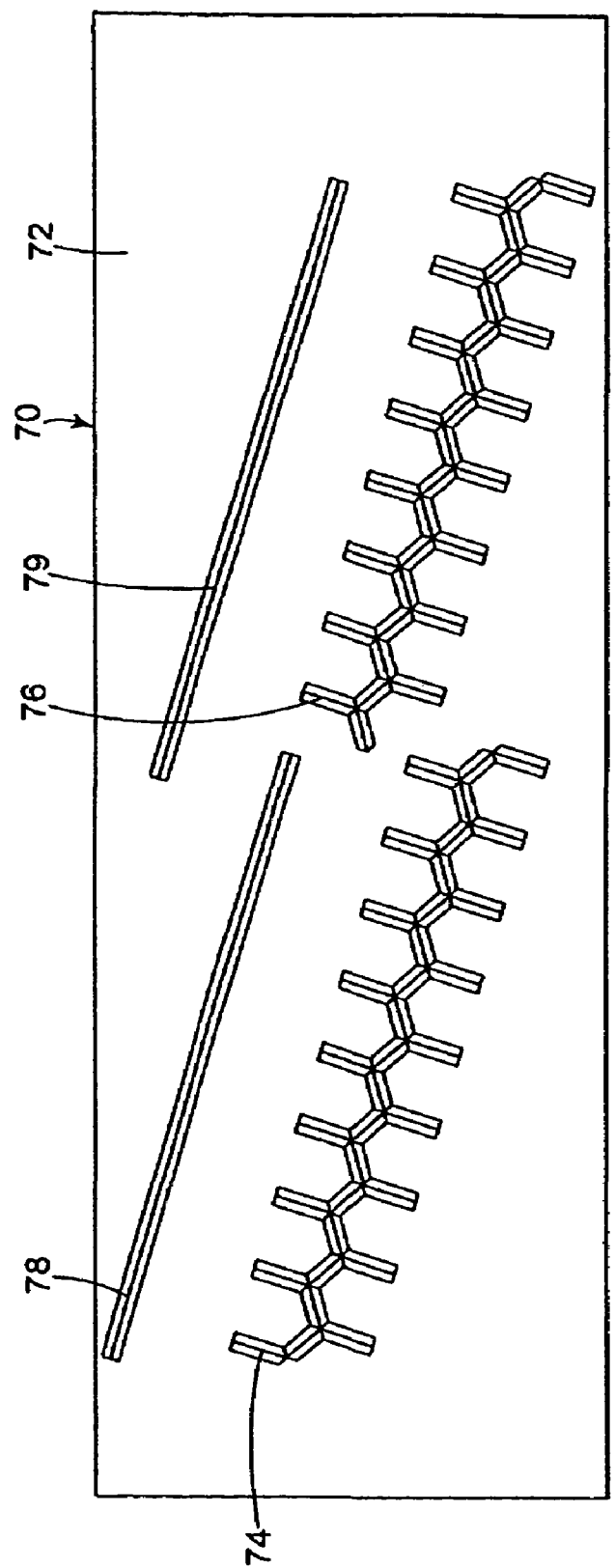
FIG. 3 is a top view of another embodiment of a die cutter in accordance with the present invention.
Figure 4A:
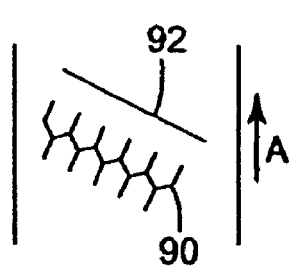
FIG. 4a through 4c are top views of a dough sheet being cut in three sequential steps by a die cutter of the present invention.
Figure 4B:
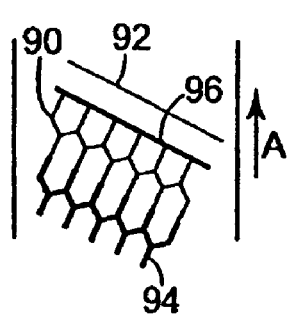
Figure 4C:
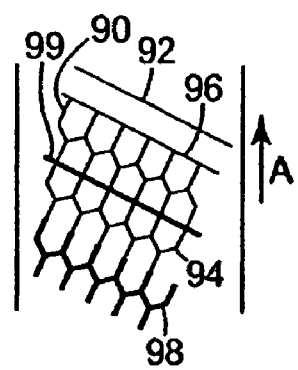

FIG. 3 illustrates another embodiment of a die cutter 70 in accordance with the present invention and FIGS. 4a through 4c show a sequential dough cutting operation using die cutter 70. Die cutter 70 includes a support base 72 from which a number of cutting blades extend. Specifically, die cutter 70 includes a first patterned blade set 74, a second patterned blade set 76, and two straight die blades 78, 79. Patterned blade sets 74, 76 are generally in the same configuration as the cutting blades 58 of die cutter 50 (i.e., four-sided, nested, semi-open patterns); however, die cutter 70 includes two separate sets of this pattern.

For purposes of the following description, only the cuts made by patterned blade set 74 and its corresponding blade 78 are illustrated in FIGS. 4a through 4c, with the understanding that two or more blade sets and corresponding straight die blades may be positioned across the width of a particular die cutter, such as blade set 76 and blade 79. In operation, die cutter 70 cuts multiple dough pieces from a dough sheet in a two-step operation. It is understood that the two steps of this operation would be basically reversed if the die cutter or cutters were oriented 180° to the dough travel direction as that described here. In the first step of the two-step operation, die cutter 70 cuts through the moving dough in patterns that match the blade set 74 and the blade 78. The die cutter 70 then retracts from the dough while the dough sheet continues to move in its travel direction A. The patterns cut in the dough are shown in FIG. 4a, with blade set 74 cutting a pattern 90 and blade 78 cutting a line 92. The die cutter 70 then moves toward the dough sheet again, while also moving generally horizontally in the direction of travel of the dough sheet (as described above). The die cutter 70 then penetrates the dough sheet again, with blade set 74 cutting a pattern 94 (as shown in bold in FIG. 4b) and blade 78 cutting a line 96 (also shown in bold in FIG. 4b). As shown, line 96 thus completes one row of the patterns by providing a side of the semi-open pattern that essentially completes or closes the pattern. As shown, a plurality of individual pentagon or "house" shaped dough pieces are thereby formed.

Again, the die cutter 70 retracts from the dough while the dough sheet continues to move in its travel direction. The die cutter 70 then moves toward the dough sheet to cut the next patterns, shown in bold in FIG. 4c. Specifically, die cutter 70 penetrates the dough sheet, with blade set 74 cutting a pattern 98 and blade 78 cutting a line 99. Thus, line 99 effectively completes or closes one row of the pattern 90 and one row of the pattern 94.

Figure 5:
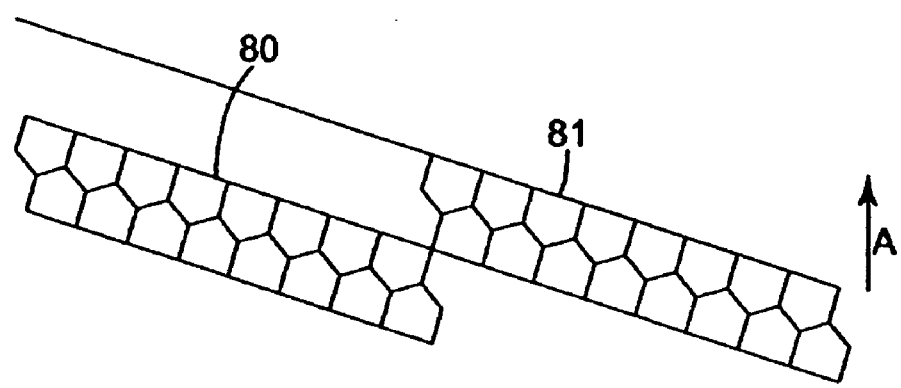
FIG. 5 is a top view of a sample pattern cut by a die cutter of the present invention.

FIG. 5 illustrates a top view of a sample pattern cut into the dough by a die cutter of the present invention, such as the die cutter of FIG. 3. This figure illustrates the manner in which two completed sets of patterns 80, 81 could be offset from each other at an angle relative to the travel direction A of the dough in order to facilitate product separation later in the process. The two sets of dies are preferably aligned so that additional die cuts will provide continuous rows of dough pieces, where some of the pieces are cut with each of the die sets. In other words, pattern 80 will be immediately adjacent pattern 81 to provide continuous adjacent rows along the length of the dough sheet.

The die cutter arrangement may also be configured so that the blade set or sets are on a separate base or bases than their corresponding straight die blades (not shown). In this embodiment, the cutting sequence could be similar to that described above; however, each blade set and straight die blade would move independently of the other such that two separate cutting strokes would be required to achieve the same dough cuts as described above with a single die cutter.

As described above, continuously moving the dough while cutting with a traveling cutter is beneficial in that dough products typically can be processed more quickly and efficiently when the production is continuous rather than intermittent. It is understood, however, that the processes described in accordance with the present invention may also be adapted for processes that are intermittent. One example of such a process is one where the dough sheet is indexed forward in its travel direction until a portion of the sheet is directly adjacent a die cutting assembly, at which point the dough sheet stops or pauses briefly while shapes are cut with a die cutter that mainly moves in a relatively perpendicular direction relative to the dough sheet. After the die cutter penetrates the dough sheet, the cutter retracts and moves back to its general starting position and the dough sheet can again move or index forward to repeat the cutting process.

In a particular die cutter, the number and arrangement of cutting blades can vary greatly, where the pentagonal shape described above can be particularly desirable for thick dinner rolls that are to be oriented and baked in a particular way. An example of one such method of placing and baking raw laminated dough products is described in co-pending U.S. patent application Ser. No. 10/246,784, filed on the same date as this application entitled "Vertically Oriented Laminated Dough Product" (D. Maniak et al.), commonly assigned to The Pillsbury Company. Such application is hereby expressly incorporated by reference in its entirety. It is understood that the processes and equipment described above could be used for a particular die cutter that only produces dough pieces with shapes that are identical to the other shapes cut by same die cutter, as shown and described above. Alternatively, a single die cutter may include two or more different patterns to cut dough pieces of different shapes and/or dimensions with the same die cutter. The die cutter may also be designed to cut a wide variety of shapes that are not pentagonal as described above, including patterns with straight, curvilinear, or irregular edges, or any combination of various edge shapes, and also any number of blade segments for any particular pattern. Examples of other shapes that may be cut include squares, octagons, truncated pyramids, and the like. In any of these configurations, it is desirable to minimize the waste material from each sheet as much as possible by the arrangement of each pattern relative to adjacent patterns, such as by nesting the patterns with each other. It is further desirable that the number and size of dough pieces is selected to match or closely match the width of the dough sheet to further minimize the amount of waste material.

Figure 6:
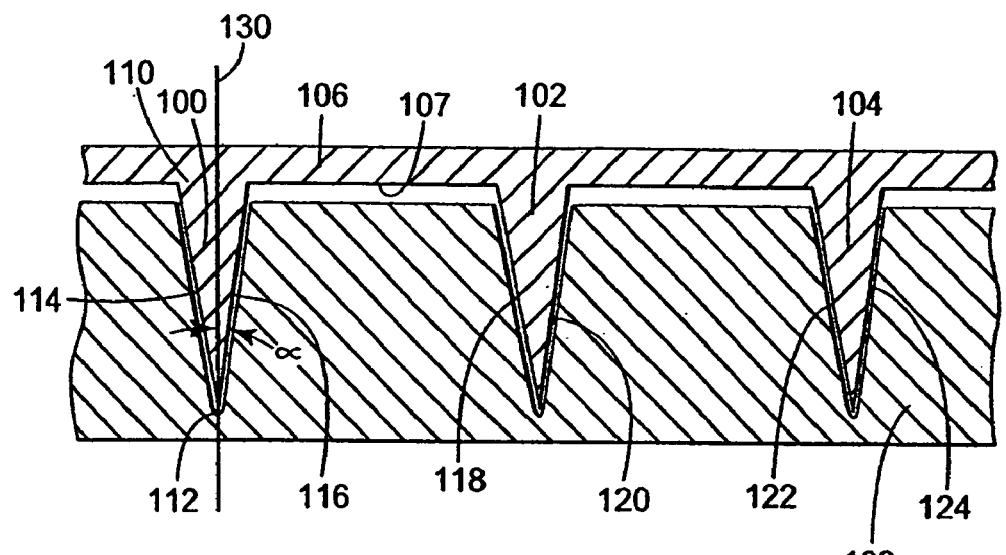
FIG. 6 is a cross-sectional view of a die cutter of the present invention cutting through a dough sheet.

FIG. 6 is a cross-sectional view of one preferable configuration of a series of three cutting blades 100, 102, and 104 extending downwardly from a support or base plate 106. These cutting blades are illustrated to be representative of multiple cutting blades arranged in a desired pattern for cutting dough pieces from a sheet of dough 108. One example of such a pattern is the pentagonal shape described above, where any two adjacent blades of FIG. 6 could represent two sides of that shape.

In the embodiment of FIG. 6, cutting blade 100 attaches to or extends from a first face 107 of base plate 106 from a base 110 (which is adjacent to the base plate 106) to a point 112. A first blade edge 114 and a second blade edge 116 each extend between base 110 and point 112 so that the cutting blade 100 is tapered from its widest point at or near base 110 to a point 112. As shown, the taper is uniform so that the blade edges 114, 116 are essentially straight or linear from base 110 to point 112; however, the blade edges 114, 116 may instead be convex or concave between base 110 and point 112. In another example, the blades edges may be essentially perpendicular to the base plate 106 where they initially extend therefrom, then start to taper toward each other at some distance from base plate 106 (not shown). Alternatively, any other regular or irregular configuration of the blade edges 114, 116 may be used to create a desired cut of the dough product. Preferably, the contour of the blade edges 114, 116 are selected to minimize the tendency of the dough to stick to the blade surfaces.

Cutting blades 102 and 104 similarly attach to or extend from first face 107 of base plate 106, where blade 102 includes a first blade edge 118 and a second blade edge 120, and blade 104 includes a first blade edge 122 and a second blade edge 124. As with blade 100, the blade edges of cutting blades 102 and 104 preferably taper from their widest points adjacent to base plate 106 to a point where the first and second blade edges meet or nearly meet at the blade end. As with many other aspects of this invention, while each of the blades on a particular die cutter are preferably identical or similar to each other, it is contemplated that a single die cutter may include blades that have significantly different cross-sections from other blades on the same die cutter.

The blade edges of blade 100 are preferably arranged symmetrically about a line 130 that extends from base 110 to point 112 in a generally perpendicular direction to the first face 107 of base plate 106. In other words, the blade edges 114 and 116 are at the same or a similar angle relative to the line 130. In one preferred embodiment, blade edges 114 and 116 are at an angle $\alpha$ that is in the range of about 1 degrees to 5 degrees relative to line 130, and more preferably the angle $\alpha$ is approximately 3 degrees. It is understood, however, that the draft angle may be either larger or smaller than those discussed for this embodiment, depending on the particular dough pieces to be cut. This angle $\alpha$ may also be referred to as the "draft angle". To better illustrate the advantages of this cutting blade arrangement, the draft angles $\alpha$ of these blades in the figures are illustrated as being larger than that described above; however, similar advantages are achieved at much smaller draft angles.

Figure 7:
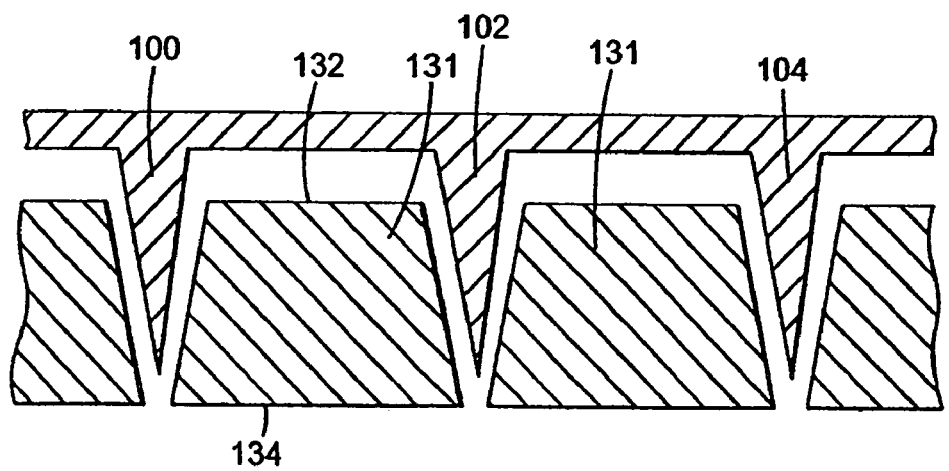
FIG. 7 is a cross-sectional view of the die cutter of FIG. 6 as it is partially retracted from multiple cut dough products.

The use of a cutting blade with a draft angle is particularly advantageous when the cutting blades are arranged in a semi-open configuration, as is best explained by further reference to the cutting blades 100, 102, and 104 illustrated in the sequential dough cutting steps of FIGS. 6 and 7. This arrangement of cutting blades represents a cross-sectional view of two pair of cutting blades (i.e., a first pair including blades 100 and 102, and a second pair including blades 102 and 104). Each blade of the pair of blades is positioned to cut one side of an individual dough product from a larger sheet of dough, such as the semi-open pattern described above. It is understood that the use of cutting blades with a draft angle is also advantageous when the cutting blades are arranged in a closed pattern configuration.

Referring particularly to FIG. 6, a portion of a sheet of dough 108 is shown as being partially severed by cutting blades 100, 102, and 104, which extend from base plate 106. As shown, adjacent cutting blades 100 and 102 are angled so that the blade edges 116 and 118 facing each other are further apart at the points or ends of the blades than at the base plate 106 and cutting blades 102 and 104 are similarly angled so that the blade edges 120 and 122 facing each other are further apart at the points or ends of the blades than at the base plate 106. FIG. 6 illustrates the cutting blades as they have cut through almost the entire thickness of the dough sheet 108. The base plate 106 with extending cutting blades 100, 102, and 104 then continues to travel downward through the dough sheet 108 until the cutting blades completely sever the dough, thereby creating individual dough pieces 131, as illustrated in FIG. 7.

FIG. 7 shows the cutting blades as the base plate and cutting blades are partially retracted from the cut dough. Due to the draft angles of the blades, the blade edges 116 and 118 are closest to each other nearest the top dough face (as are the blade edges 120 and 122), so the dough is slightly compressed near a top face 132 of each dough piece 131. In other words, the dough is wider at its base 134 than at its top face 132. This resulting shape of the dough piece reduces its tendency to stick within the space or opening between the cutting blades, since the weight of the dough makes the dough piece tend to "fall" from the cutting blades as the blades are pulled away from the dough. Other methods of minimizing the tendency of dough to stick to the cutting blades may also be used, such as coating the blades with a non-stick material and/or coating the dough sheet with a substance such as flour or oil.

While preferred draft angles were set out above relative to FIGS. 6 and 7, the draft angle may be adjusted to achieve the desired cutting performance and final product configurations. For example, as the draft angle is increased, the dough products will typically be less likely to stick to the cutting blades; however, the product will also be somewhat more deformed (i.e., the top portion of each dough piece will be more compressed as compared to the base of that dough piece). For another example, as the draft angle is decreased, the surface tension at the cutting blades will increase, thereby making the dough pieces tend to stick more to the cutting blades.

As shown, cutting blades 100, 102, 104 are identical to each other; however, the blades may also be different from each other, depending upon whether particular advantages are achieved by having differently shaped or sized cutting blades on a single die cutter. For example, it may be desirable for the blades that are cutting nearest the edges of the dough sheet to have one blade edge with a draft angle and one blade edge that is perpendicular to the base plate. It is contemplated that any combination of the features described above relative to the die blades (e.g., their shapes, sizes, and the like) could be included in the various blades of a die cutter.

FIG. 8 shows one example of a conveyor assembly 150 that can be used in a production line of the type described above. As illustrated, conveyor assembly 150 generally comprises a product processing conveyor 152 and a product take-away conveyor 154. In operation, a continuous sheet of dough 160 moves in a travel direction B from the preceding processing equipment until it reaches the product processing conveyor 152. For illustration and explanation purposes, a centerline 156 is shown in the approximate center of the conveyors 152, 154 and is generally parallel to the travel direction B. In this configuration, continuous sheet of dough 160 is transported by conveyor 152 to position the uncut dough in a dough cutting area 162, represented generally by the rectangular area in the figure. In this cutting area, the dough sheet 160 is cut into individual dough pieces 164 by a die cutting operation that is preferably similar to that described above. That is, the dough is preferably cut with a traveling or walking cutter so that the dough can continuously move while being cut.

As illustrated, the dough pieces 164 are cut from dough sheet 160 in rows 166 that extend across most of the width of the dough sheet. As is also illustrated, the rows are arranged at an angle β relative to the centerline 156, where angle β is preferably in the range of 0 degrees to about 90 degrees, where one preferred angle is about 73 degrees. In other words, the cut edges of the dough pieces are preferably not perpendicular to the travel direction B. At least one advantage of having the angle β be greater than 0 and less than 90 degrees is that the dough pieces 164 will tend to separate from each other more readily as they reach the conveyor 154, as explained in further detail below.

After the individual dough pieces 164 are cut, the pieces remain adjacent to each other and continue to move along the product processing conveyor 152 at a relatively constant speed until they reach the product take-away conveyor 154. The conveyor 154 preferably moves at a faster speed than the processing conveyor 152. For example, the processing conveyor 152 may travel at a speed of approximately 12-15 feet/minute, while the take-away conveyor 154 travels at a speed of approximately 20-30 feet/minute. Due to the angle β, each dough piece 164 in any particular row 166 reaches an interface 168 between the processing conveyor 152 and the take-away conveyor 154 at a slightly different time. Thus, as each piece 164 reaches the interface, it is immediately moved by conveyor 154 at a faster speed than the adjacent dough pieces 164 that are still moving at the speed of conveyor 152. In this way, the dough pieces 164 that reach the take-away conveyor 154 tend to separate from the adjacent dough pieces 164 that are immediately behind them on the conveyor 152.

As the dough pieces 164 continue to move along the take-away conveyor 154, they will often remain in the same general rows as when they were cut, even though adjacent rows tend to separate from each other. FIG. 9 illustrates, however, that each piece 164 within an individual row tends to be separated at least slightly from each adjacent piece 164 in that same row, due to the different speeds of the conveyors.

The dough material along the opposite edges of the continuous sheet of dough 160 that do not become part of one of the individual dough pieces 164 are considered to be the trim or waste pieces 170, which are preferably removed and may be discarded or reprocessed, as appropriate. In order to minimize the size of trim or waste pieces 170, the die or series of dies that are used for the cutting operation from that sheet of dough are preferably designed to cut full dough piece patterns across essentially the entire width of a dough sheet and as close to each edge of the dough sheet as is practically possible.

Figure 10:
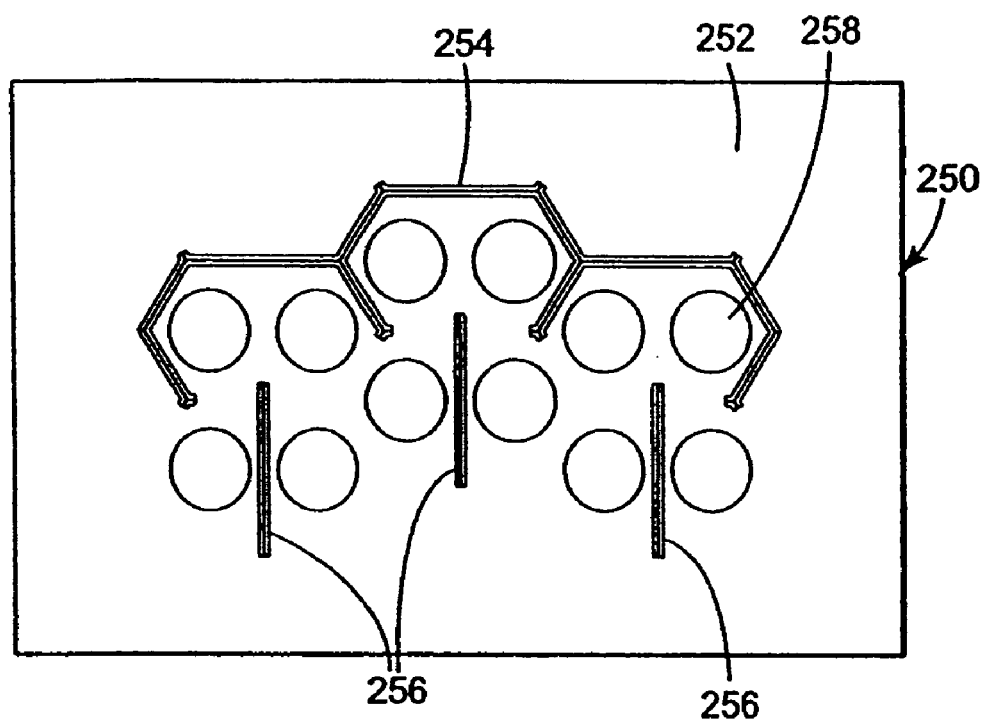
FIG. 10 is a top view of another configuration of a die cutter of the present invention.

FIGS. 10 and 11 illustrate another configuration of the die cutting method of the present invention, where FIG. 10 illustrates a die cutter which cuts dough in the arrangement of FIG. 11. Specifically, FIG. 10 illustrates a die cutter 250 that includes a support base or plate 252 from which a number of cutting blades extend. Die cutter 250 includes a patterned blade set 254 and three straight die blades 256. As described above relative to FIGS. 3 through 5, the die cutter 250 similarly cuts multiple dough pieces from a dough sheet in a two-step operation. In the first step of the operation, die cutter 250 cuts through the moving dough in patterns that match the blade set 254 and the die blades 256, as the dough moves continuously in a travel direction. The die cutter 250 then retracts from the dough while the dough sheet continues to move in its travel direction. The blade set 254 and die blades 256 are aligned with each other and synchronized relative to the speed of the moving dough so that when the die cutter 250 again contacts the dough in the second step of the operation, the die blades 256 complete the semi-open patterns created by the blade set 254, or vice versa.

This embodiment also illustrates another die cutter feature that can assist in product removal from die pattern openings and may be included in any of the die cutter arrangements of the present invention. Specifically, die cutter 250 can optionally include one or more openings 258 that can each accommodate a mating punch (not shown), where each punch can protrude through a corresponding opening to push the product away from the die plate during the cutting sequence. Preferably, one opening 258 and a corresponding punch are provided for each individual dough piece that is cut from a dough sheet. Alternatively, air may be forced through these openings 258 to facilitate product release. In this arrangement, a mating punch would not be used.

FIG. 11 illustrates an example of a conveyor assembly 260 using the die cutter 250 described above. As illustrated, conveyor assembly 260 generally comprises a product processing conveyor 262 and a product take-away conveyor 264. In this configuration, a continuous sheet of dough 270 is transported by

The invention claimed is:

1. A die cutter for cutting a plurality of dough pieces from a continuous sheet of dough, the die cutter comprising:
   a base plate having a first side and an opposite second side;
   a first blade pattern extending from the first side of the base plate, the first blade pattern comprising at least one blade section for cutting a first portion of the periphery of a first dough piece; and
   a second blade pattern extending from the first side of the base plate, the second blade pattern being separate, spaced from, and laterally offset from the first blade pattern and comprising at least one blade section for cutting a second portion of the periphery of the first dough piece;
   wherein the first blade pattern and second blade pattern are provided to successively cut complimentary portions of the first dough piece to thereby cut the entire periphery of the first dough piece.

2. The die cutter of claim 1, wherein one of the first and second blade patterns comprises multiple connected blade sections, wherein each blade section is arranged at an angle relative to each adjacent blade section.

3. The die cutter of claim 2, wherein the other of the first and second blade patterns comprises a single, linear blade which is laterally offset from the multiple connected blade sections.

4. The die cutter of claim 3, wherein the first and second blade patterns are arranged to cut a pentagonal shape from a sheet of dough.

5. The die cutter of claim 1, wherein the first blade pattern comprises at least one blade extending from a blade base having a first width adjacent the base plate to a distal point having a second width furthest from the base plate, wherein the first width is greater than the second width.

6. The die cutter of claim 5, wherein the at least one blade includes at least a first blade edge and a second blade edge, wherein the first and second blade edges are tapered from the blade base to the distal point of the blade at a constant angle relative to the base plate.

7. The die cutter of claim 6, wherein the first and second blade edges are at an angle in the range of about 1 degree to about 5 degrees relative to a line that is perpendicular to the base plate.

8. The die cutter of claim 1, wherein the first blade pattern has a different configuration than the second blade pattern.

9. The die cutter of claim 1, wherein the first blade pattern and second blade pattern are elongated in a direction of travel of the continuous dough sheet.

10. The die cutter of claim 1, wherein the first blade pattern and second blade pattern are provided to successively cut complimentary portions of multiple individual dough pieces to thereby cut the entire periphery of each of the multiple individual dough pieces.

11. The die cutter of claim 10, wherein the multiple individual dough pieces constitute more than two dough pieces.

12. A dough cutting apparatus for producing multiple individual dough pieces from a continuous dough sheet comprising:

means for conveying a continuous dough sheet along a travel path from a first position to a second position;

first cutting means for simultaneously cutting a first portion of a peripheral shape of each of the multiple individual dough pieces when the dough sheet is in the first position; and second cutting means for simultaneously cutting a second portion of the peripheral shape of each of the multiple individual dough pieces when the dough sheet is in the second position, wherein the first cutting means and the second cutting means are provided to successively cut complimentary portions of the each of the multiple individual dough pieces to thereby cut an entire periphery of each of the multiple individual dough pieces.

13. The dough cutting apparatus of claim 12 wherein one of the first and second cutting means comprises multiple connected blade sections, wherein each blade section is arranged at an angle to each adjacent blade section.

14. The dough cutting apparatus of claim 13, wherein the other of the first and second cutting means comprises a single, linear blade.

15. The dough cutting apparatus of claim 12, wherein the first cutting means has a different configuration than the second cutting means.

16. The dough cutting apparatus of claim 12, wherein the multiple individual dough pieces constitute more than two dough pieces.

* * * * *